W. W. HUNZICKER.
AUTOMATIC SLACK ADJUSTER.
APPLICATION FILED AUG. 18, 1919.
1,347,634.
Patented July 27, 1920.
2 SHEETS—SHEET 1.
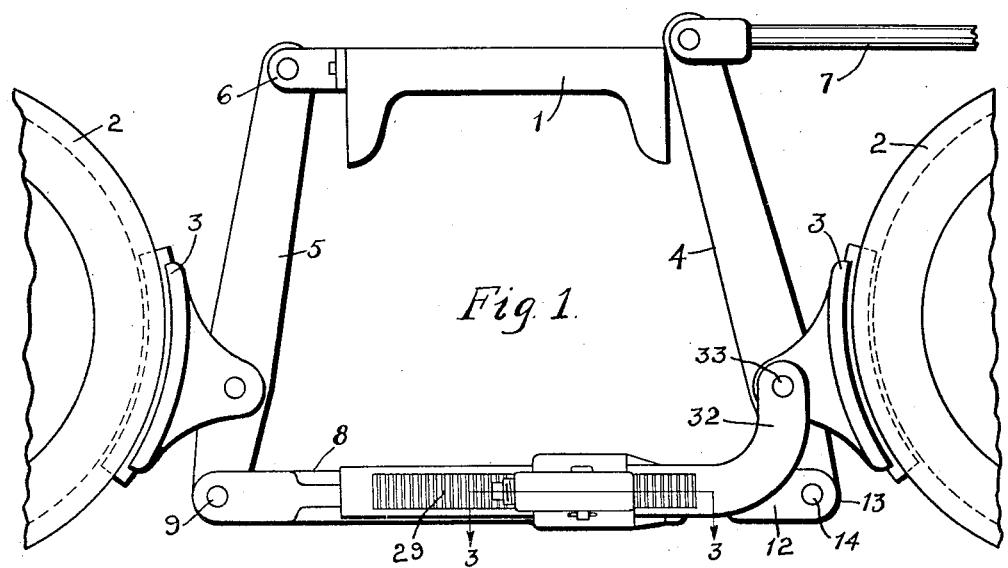
Fig. 1.
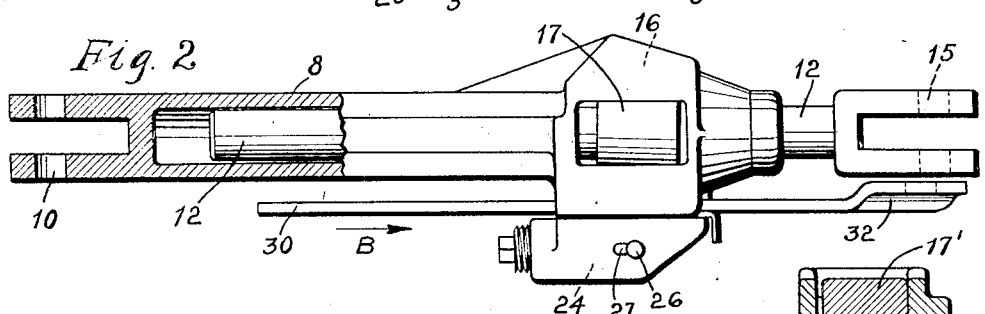
Fig. 2.
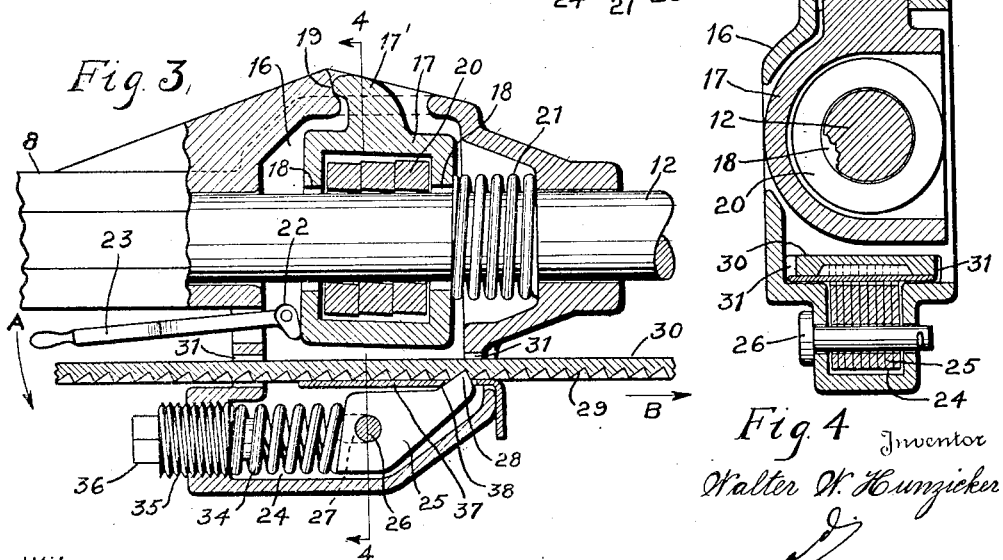
Fig. 3.
Fig. 4.
Inventor
Walter W. Hunzicker
Witness
Harry Wilkinson
By
Attorney

W. W. HUNZICKER.
AUTOMATIC SLACK ADJUSTER.
APPLICATION FILED AUG. 18, 1919.

1,347,634.

Patented July 27, 1920.
2 SHEETS—SHEET 2.

Witness
Harry Wilkinson

Inventor
Walter W. Hunzicker.

Attorney

UNITED STATES PATENT OFFICE.

WALTER W. HUNZICKER, OF MANSFIELD, OHIO, ASSIGNOR TO THE OHIO BRASS COMPANY, OF MANSFIELD, OHIO, A CORPORATION OF NEW JERSEY.

AUTOMATIC SLACK-ADJUSTER.

1,347,634.  Specification of Letters Patent.  Patented July 27, 1920.

Application filed August 18, 1919. Serial No. 318,127.

*To all whom it may concern:*

Be it known that I, WALTER W. HUNZICKER, a citizen of the United States of America, residing at Mansfield, in the county of Richland and State of Ohio, have invented certain new and useful Improvements in Automatic Slack-Adjusters, of which the following is a specification.

My invention relates to improvements in slack adjusters and more particularly to the type of slack adjusters adapted to be mounted between and connected to the lower ends of the live and dead levers of railway brake riggings, or the like, and which operate to maintain a predetermined amount of clearance between the brake shoes and wheels.

Due to abnormal conditions such as rapid braking, heavy car loading, and various other causes, it has been found that considerable false or excessive travel of the operating levers is frequently occasioned irrespective of any wear of the parts and which travel, if taken up, eliminates the proper clearances between the parts when operating under normal conditions, thus causing tight brakes or undue friction between the parts and otherwise rendering the system inefficient and liable to damage or breakage.

The present invention seeks to provide an improved slack adjuster which will be extremely practical and which will operate under any and all conditions to maintain the brake rigging in a high state of efficiency.

Furthermore, the invention seeks to provide a device of this character which will be simple, compact and durable in construction, which is applicable to trucks of various types now in use, which will be inexpensive to manufacture, and which will not require attention or adjustment when once installed.

To this attainment of these ends and the accomplishment of other new and useful objects as will appear, the invention consists in the novel features of construction, combination of parts, and in the unique relations of the various parts herein- and disposition of the various parts herein- and after more fully described and claimed and shown in the accompanying drawings which illustrate several embodiments of the invention, and in which:—

Figure 1 is a side elevational view of a conventional brake rigging showing only such parts as are necessary to illustrate the embodiment of one form of the invention and in which the brakes are shown as released.

Fig. 2 is an enlarged top view of the slack adjuster shown in Fig. 1 and embodying my invention.

Fig. 3 is a sectional view of the permanent and temporary take-up and holding means taken substantially on the line 3—3 of Fig. 1.

Fig. 4 is a transverse sectional view taken on the line 4—4 of Fig. 3.

Figure 5:
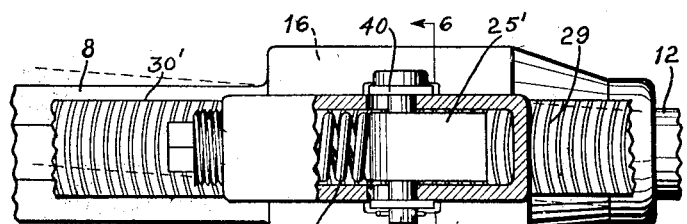
Fig. 5 is a side view of the temporary take-up and holding device showing a modified construction.

While the present invention is shown and described as applied to a beamless truck, it will be understood that it may be applied to other types of trucks or brake riggings equally as well and without departing from the spirit and scope of this invention.

Similar reference characters refer to similar parts throughout the various views in the drawings.

Referring to the drawings and more particularly to Fig. 1, reference numeral 1 indicates a truck bolster at either side of which are positioned wheels 2 each provided with a brake shoe head 3 which as shown are pivotally supported by the live and dead levers 4 and 5 respectively. The dead lever 5 is pivotally supported at its upper end by a bracket 6 secured to the bolster 1, while the live lever 4 has its corresponding end preferably connected to one end of a pull rod 7 which in turn is connected to the brake actuating mechanism, not shown. The lower ends of the levers 4 and 5 are connected by an adjustable push rod adapted to take up and hold the slack as occasioned by wear and which forms the subject matter of the present invention. While I have shown the brake shoe heads 3 as supported solely by the levers it will be understood that suitable hangers, connected to the parts in the usual manner, may also be employed if desired.

The push rod, or slack adjuster, as shown in Figs. 1 to 4 inclusive, comprises two telescoping parts, one of which is a tubular member 8 pivotally connected at 9 to the lower end of the dead lever 5 by means of a suitable bolt passing through an opening 10. Slidably mounted within this tubular member 8 is a solid rod 12 which forms the other part of the slack adjuster and which is pivotally connected at 13 to the lower end of the live lever by means of a bolt 14 passing through an opening 15.

The tubular member 8 is formed with an enlarged chamber or housing 16 at one end within which is positioned a holding device comprising as shown in Fig. 2, a holder 17 provided with openings 18 through which the rod 12 is adapted to freely pass and having a fulcrum engagement or connection with the tubular member 8 as indicated at 19, about which the holder is adapted to pivot or rotate. This connection or pivotal engagement is effected by means of the lug projection 17' preferably formed integrally with the holder 17 and which lug projection serves also to interlock the holder with the tubular member against relative rotation when arranged in operative position, as will be apparent in Fig. 4. Arranged within the holder is a plurality of holding dogs 20, preferably of circular formation, provided with openings having hardened edges through which the rod 12 passes. A spring 21 is compressed within the chamber 16 and exerts its pressure against the holder 17 thereby to maintain the dogs in canted position where they operate to prevent inward telescopic movement of the rod 12 but permit free outward movement thereof in a manner well understood in the art. For the purpose of releasing the dogs when it is desired to reset the device, any suitable mechanism may be provided, such as a cam 22, provided with a lever 23, which when rotated in the direction indicated by arrow A operates to shift the holder 17 to a position transverse to the rod 12 and in which position of the holder the dogs will be in released position.

The housing 16 is formed with a cavity 24 having a laminated pawl 25 pivotally and slidably mounted therein by means of a pin 26 passing through the pawl and operating in slots 27 formed in the walls of the cavity. This pawl is provided with a lip 28 adapted to engage and coöperate with teeth 29 formed on one side of an adjusting rod 30 passing through openings 31 formed in the housing and having one end 32 thereof turned upwardly and connected with the pin 33 which forms the fulcrum point of the live lever, as will be described hereinafter.

Arranged within the cavity 24 is a spring 34, one end of which bears against the adjacent end of the pawl 25 and which is held in position and under compression by means of an adjusting screw 35 bearing against the opposite end thereof. This spring is adapted to yieldably maintain the pawl in operative position and may be adjusted to bring any desired or predetermined amount of pressure to bear upon the pawl by simply rotating the adjusting screw in one direction or the other as by means of a wrench applied to the squared end 36 thereof, or any other suitable means.

In operation the pawl 25 functions in a manner to permit relative movement of the adjusting rod 30 in either direction. Movement of the rod in one direction, as indicated by arrow B, will be hereinafter referred to as forward movement, while movement in the opposite direction will be referred to as a backward movement. The pawl operates as follows:—During movement of the adjusting rod in the forward direction the pawl is caused to pivot or rotate about its pin 26 by reason of the inclined surfaces of the teeth 29 tracking under the lip 28 of the pawl. This rotation of the pawl slightly compresses the spring 34 but not to a degree to effect any substantial resistance to movement of the rod in this direction. Movement of the adjusting rod in the opposite or backward direction operates to slide or move the pawl against direct action of the spring 34 and during this movement of the pawl it is caused to rotate about its pivot pin 26 and out of engagement with the teeth 29 by reason of engagement with the tripping plate 37 as indicated at 38, Fig. 3.

From the foregoing it will be obvious that the adjusting rod is free to move in either direction and that forward movement of the rod is accompanied with very little resistance while backward movement thereof is resisted or retarded by direct action of the spring 34 which may be adjusted to offer any desired or predetermined amount of resistance. The adjusting rod and mechanism coöperating therewith and adapted to permit functioning of the rod as above stated shall hereinafter be referred to as a temporary take-up and holding device connected to one of the levers and associated with one of the parts of the push rod.

It will be noted that the construction and arrangement of the teeth 29 and pawl 25 is such as will provide for a limited amount of forward movement of the rod without causing the pawl to move into engagement with another tooth. The amount of this movement is dependent upon the spacing of the teeth and approximates the lost motion provided for brake shoe clearance.

In order that a clear understanding of the device may be had a brief statement of the operation is as follows:—When the brakes are released the operating levers are disposed as shown in Fig. 1 and the brake shoes held out of engagement with the wheels. On application of the brakes the upper part of the live lever 4 is moved toward the right which causes the adjacent brake shoe to move into contact or engagement with the periphery of the adjacent wheel and react through the push rod or slack adjuster to move the opposite brake shoe into engagement with the adjacent wheel by moving the lower end of the dead lever 5 toward the left about its fixed pivotal point. During this movement of the live lever the adjusting rod 30, being connected thereto, moves forwardly but not sufficiently to permit the pawl 25 to move into engagement with another tooth, that is, providing there is no slack or lost motion to be taken up. Upon release of the brakes the adjusting rod will move backwardly and into the same position in which it rested prior to the application of the brakes. This operation will continue indefinitely so long as the clearance between the shoes and wheels is proper and there is no lost motion to be compensated for. Continued operation of the brake however is accompanied by brake shoe wear which permits excess travel or movement of the live lever and adjusting rod beyond the predetermined lost motion allowed by the spacing of the teeth 29. This excessive movement of the live lever and adjusting rod allows the pawl to move into engagement with the next following tooth of the adjusting rod and thereby extend the latter. On release of the brakes the parts tend to return to normal position under the action of the usual return springs not shown. During return of the parts to normal position the upper end of the live lever moves toward the left, carrying the brake shoes out of engagement with the wheels and as the adjusting rod has been extended, in consequence of this relation, the pivot pin 33 acts as a fulcrum about which the live lever rotates during a portion of the full return movement of the lever, thereby causing the lower end of the live lever to move toward the right and expand the slack adjuster to compensate for the excessive travel or slack caused by wear. During this adjustment of the parts the pawl 25 coöperates with the adjusting rod 30 to hold the tubular member 8 while the rod 12 is pulled out.

The device operates as above described under normal conditions to take up excessive movement of the brake shoes caused by wear. In actual operation, however, certain types of trucks under abnormal conditions, such as heavy car loading or rapid braking, permit downward movement of the brakes and rigging as well as toward the wheels which will cause excessive movement of the levers, adjusting rod and brake shoes and upon release of the brakes, when the brake rigging is in this abnormal lowered position, the adjusting rod will be subject to excessive pressure during the return movement of the live lever. It is at this point that the pawl 25 yields to backward movement of the adjusting rod thereby preventing bending of the rod, improper adjustment of the parts, or other injury to the rigging.

Figure 6:
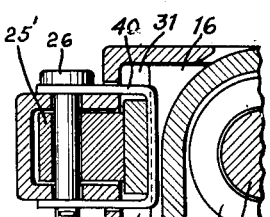
Fig. 6 is a sectional view taken on the line 6—6 of Fig. 5.
Figure 7:
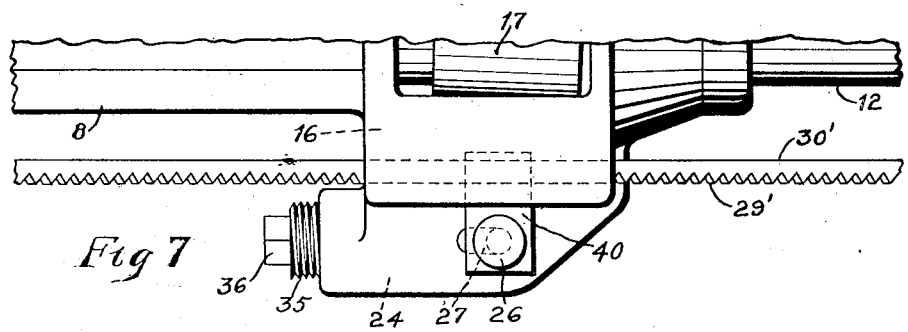
Fig. 7 is a top view of Fig. 6.

In the construction shown in Figs. 5, 6 and 7, solid pawl 25' is employed and adapted to coöperate with an adjusting rod 30' having teeth 29' of circular formation. This arrangement provides for a slight pivotal or rotary movement of the rod, as indicated in dotted lines, and which is provided for in the construction shown in Figs. 1 to 4 inclusive by means of the laminated pawl which readily adjusts itself to various positions of the rod. As shown in this construction, the pawl and adjusting rod may be interlocked against lateral displacement in one direction by means of a shackle 40 having its free ends connected to the pin 26 and embracing the adjusting rod, as shown more clearly in Fig. 6. In this construction any pressure of the pawl mechanism against the adjusting rod will be confined to the shackle thereby preventing frictional engagement between, or rubbing together of, the adjacent surfaces of the adjusting rod 30 and the tubular member 8. It will be understood that this shackle can be applied to the various constructions shown, or modifications thereof, and that it is not essential to the operation of the device.

Figure 8:
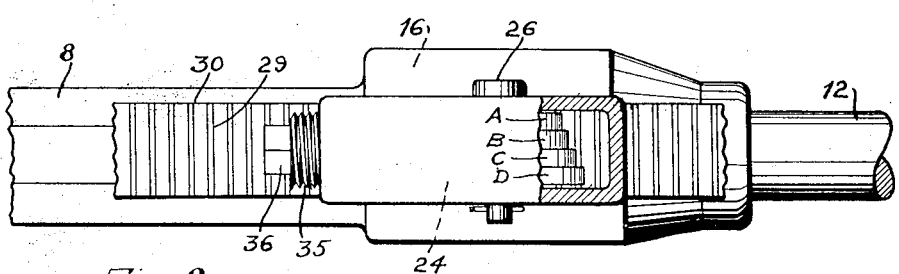
Fig. 8 is a view similar to Fig. 5 showing still another modification of the temporary take-up and holding mechanism.
Figure 9:
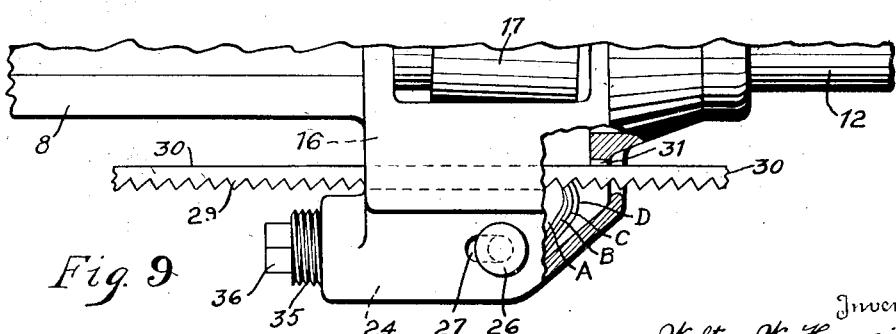
Fig. 9 is a top view of the mechanism shown in Fig. 8.

The construction shown in Figs. 8 and 9 differs from that shown in Figs. 1 to 4 inclusive only in that the parts or laminations of the pawl are of different length as indicated at A—B—C and D, so that, if the adjusting rod moves one-fourth of the distance between the teeth of the rod one of the pawls will move into engagement with one of the teeth of the rod. It will be understood that any number of pawls of different length may be employed to obtain any desired or required amount of adjustment and that if necessary the adjusting rod may be provided with the usual lost motion slot, not shown, to permit lost motion for brake shoe clearance.

Having thus fully described my invention and illustrated several embodiments of the same I do not wish to be limited to the details of the construction shown since these can be obviously changed without departing from the spirit and scope of the invention.

I claim:—

1. A slack adjuster comprising, in combination, a two-part telescopic push rod, one of said parts containing a housing, and a holding device movably arranged within the housing and adapted to engage one of the parts to prevent relative movement of said parts in one direction, said holding device comprising a holder and a plurality of dogs arranged within the holder.

2. In an automatic slack adjuster, in combination, a two-part telescopic push rod and a holding device adapted to coact with said parts to permit relative telescopic movement in one direction only, the holding device comprising a holder having pivotal engagement with one of said parts, and a plurality of holding dogs arranged within the holder.

3. An automatic slack adjuster comprising, in combination, a two-part telescopic push rod and a holding device associated therewith adapted to interlock the parts against relative telescopic movement in one direction, said holding device comprising a holder having pivotal engagement with one of the parts for movement in a plane extending longitudinally of said part and encircling the other part of the push rod, and means for preventing relative rotation of the holder in a plane extending transversely to said part.

4. A slack adjuster comprising, in combination, a two-part telescopic push rod, one of said parts containing a housing, a holding device comprising a holder having a plurality of dogs arranged therein mounted within the housing and having pivotal engagement therewith, and spring means for urging said holding device into operative position.

5. A slack adjuster comprising, in combination, a two-part telescopic push rod, one of said parts containing a housing, a holder having pivotal engagement with the housing arranged therein and provided with perforations through which the other part passes, a plurality of holding dogs having perforations through which said other part passes arranged within the holder, and a spring within the housing exerting pressure against the holder thereby to maintain the dogs in canted position.

6. A slack adjuster comprising a two-part telescopic push rod and holding means therefor, in combination with operating means comprising, an adjusting rod having teeth provided on one side thereof, and spring controlled means associated with one of said parts and having engagement with said teeth whereby the rod may move relatively in either direction under proper pressure.

7. An automatic slack adjuster comprising a two-part telescopic push rod and holding means therefor, in combination with operating mechanism for extending the parts to take up slack comprising an adjusting rod and a pawl both movably supported by one of said parts, the adjusting rod having teeth for slidable engagement with the pawl, and spring means for urging the pawl into engagement with the teeth and automatically permitting relative movement of the adjusting rod in either direction, the pressure to overcome the engagement being greater in one direction than in the other.

8. In an automatic slack adjuster for brake rigging the combination with a two-part telescopic push rod and holding means therefor, of adjusting mechanism comprising an adjusting rod movably supported by one of said parts and provided with teeth, and a spring controlled pawl pivotally supported by one of said parts for engagement with said teeth and operating to permit movement of said adjusting rod in either direction when subjected to pressure.

9. An automatic slack adjuster comprising a two-part telescopic push rod and holding means therefor, in combination with operating mechanism comprising an adjusting rod slidably supported by one of said parts and provided with teeth, a pawl mounted for pivotal and slidable movement supported by one of said parts and in engagement with said teeth, and a spring operating to maintain the pawl in operative position, said pawl permitting movement of the adjusting rod in one direction by pivotal movement and yielding to movement of the rod in the opposite direction by combined pivotal and sliding movement.

10. In an automatic slack adjuster the combination of a two-part telescopic push rod, holding means therefor, and adjusting mechanism, said mechanism comprising an adjusting rod slidably supported by one of said parts for movement in both directions and having teeth provided on one side thereof, a pawl pivotally and slidably connected to one of said parts adapted to coact with said teeth to permit movement of the rod in one direction when subjected to slight pressure and to yield to movement of the rod in the opposite direction when subjected to a predetermined amount of pressure, a spring urging said pawl into operative position, and means for varying the tension of the spring.

11. In an automatic slack adjuster the combination of a push rod comprising an outer part and an inner part in telescopic relation, holding means for preventing telescopic movement of the parts in one direction but permitting free movement in the opposite direction, and an operating device therefor, said device comprising an adjusting rod slidably connected to said outer part for relative movement in both directions, a spring actuated pawl pivotally and slidably supported by said outer part adapted to coact with said teeth to yieldingly resist movement of the adjusting rod in one direction and to permit movement of said rod in the opposite direction when subjected to slight pressure, and means for imparting rotary movement to the pawl when actuated by movement of the adjusting rod in one direction.

12. In an automatic slack adjuster the combination of a two-part telescopic push rod, holding means therefor, and an operating device, said device comprising an adjusting rod and a spring actuated pawl both movably connected to one of said parts, the adjusting rod provided with teeth to coact with the pawl, and means engaging the pawl and the adjusting rod and serving to counteract the pressure therebetween thereby to eliminate friction between the adjusting rod and the push rod, as described.

13. In an automatic slack adjuster the combination of a push rod comprising an outer part and an inner part in telescopic relation, holding means normally held in canted position for preventing inward telescopic movement of the parts, and an operating device, said device comprising an adjusting rod and a spring actuated pawl both movably connected to said outer part, the adjusting rod provided with teeth to coact with the pawl, and a shackle connected to the pawl and embracing the adjusting rod adapted to bear the pressure therebetween thereby to relieve said outer part of frictional engagement with the adjusting rod.

14. In an automatic slack adjuster the combination of a two-part push rod comprising an inner and an outer part in telescopic relation, the outer part provided with a housing through which the inner part passes, a holding device in the housing normally held in locking position for preventing inward telescopic movement of the parts but permitting free outward movement thereof, and an operating device, said operating device comprising an adjusting rod passing through said housing and provided with a plurality of teeth, a pawl pivotally and slidably mounted in a cavity formed in the housing and adapted to coact with said teeth when movement is imparted to the adjusting rod in either direction, a spring in the cavity for urging the pawl into operative position, and means for varying the tension of the spring.

15. In an automatic slack adjuster a tubular member, a member coacting therewith, and a housing formed integrally with the tubular member having a holding device and an operating device associated therewith, said operating device including an adjusting rod provided with teeth and a spring actuated pawl mounted for pivotal and sliding movement within the housing coacting with the teeth of said rod to permit relative movement of the adjusting rod in either direction when subjected to pressure of a predetermined amount.

16. A slack adjuster comprising in combination, a two-part telescopic push rod, one of said parts constituting an enlarged housing, a holding device within the housing and having pivotal engagement therewith, said device comprising a holder having a plurality of holding dogs arranged therein, spring means within the housing for urging said holding device into operative position where it operates to prevent inward telescopic movement of the push rod, and means for releasing the holding device.

17. A slack adjuster comprising in combination a two-part telescopic push rod, one of said parts provided with an enlarged chamber, a holder in the chamber and pivotally engaging a fixed stop, one or more independently acting dogs held within the housing and each engaging the other part of the push rod and yielding means acting on the holder to rotate the same about the pivotal point and cause the dogs to grip and hold the parts against relative movement in one direction but permitting free movement in the other direction.

In testimony whereof I affix my signature.

WALTER W. HUNZICKER.